United States Patent Office 3,479,689
Patented Nov. 25, 1969

3,479,689
HEATED GODET FOR STRETCHING SYNTHETIC FILAMENTS AND FILMS
Herbert Kurzke, Kelkheim, Taunus, Gunther Bauer, Bobingen, and Karl Heinrich, Augsburg, Germany, assignors to Farbwerke Hoechst Aktiengesellschaft, Frankfurt am Main, Germany, a corporation of Germany
Filed June 13, 1967, Ser. No. 645,744
Claims priority, application Germany, June 15, 1966, F 49,467
Int. Cl. D01d 1/00
U.S. Cl. 18—1                                    5 Claims

ABSTRACT OF THE DISCLOSURE

Heated godet comprising a cylinder rotating around a stationary core acting as a heating body, the gap formed by the heating body and the rotating cylinder being filled with a defined heating liquid which advantageously circulates through the heating body as well as through the gap formed by the heating body and the rotating cylinder.

---

Figure 1:
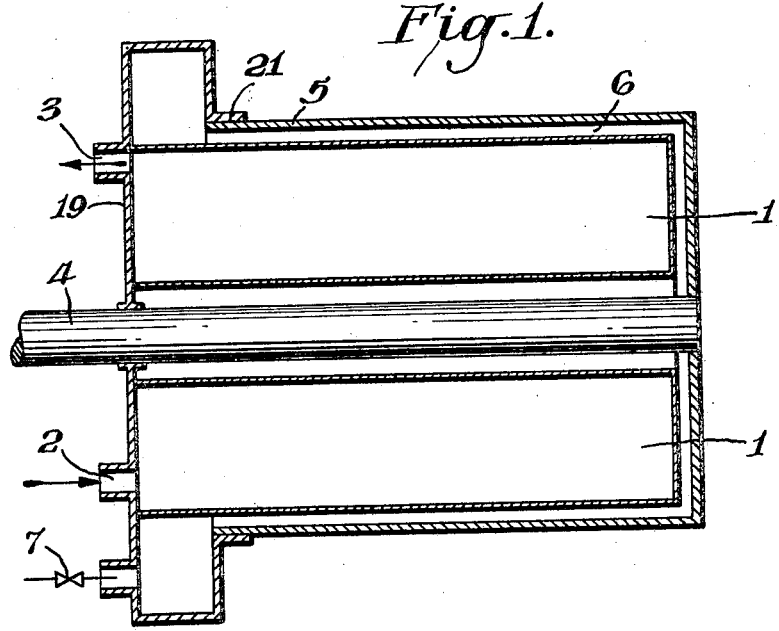

The present invention provides a heated godet for stretching synthetic filaments and films.

For drawing synthetic filaments and monofils, films and ribbons, driven cylinders, so-called godets, are used. These cylinders are often heated in order to achieve a determined temperature for drawing or stretching. Numerous types of such heated godets are known. Thus it is known that a godet is heated by a jointly rotating heating body which is supplied with electric energy by means of slip-rings. The temperature regulation of such a godet is, however, complicated, expensive and not sufficiently reliable since the real value of the temperature as the potential difference of thermoelectric elements or resistance thermometers, etc., has to be transferred from rotating parts to a stationary regulator by means of slip-rings, mercury contacts or similar devices.

It is furthermore known that a rotating godet is charged with a heating liquid, for example oil; but this gives rise to considerable difficulties in sealing this device.

Also known are godets which are heated by a stationary heating body fixed within their interior, the heating body and the rotating cylinder forming a narrow space filled with air. In this device the temperature of the heating body is regulated. Owing to the high heat transfer resistance between heating body and godet surface which carries the filament, the temperature of the surface depends too much on the environmental conditions and on the production allowances to be still sufficiently constant at an economical speed.

We have now found that all disadvantages and difficulties mentioned can be avoided using the heated godet of the invention, which comprises a rotating cylinder and a stationary heating body placed in its centre, wherein the gap formed by the stationary heating body and the rotating cylinder is filled with a heating liquid whose thermal conductivity is better than that of air.

The heating liquid filling the gap formed by the stationary heating body and the rotating cylinder directly transfers the heat from the heating body to the rotating cylinder, thus assuring a quick and uniform adaptation of the surface temperature of the godet to the temperature of the heating body.

The temperature of the godet surface is therefore considerably less dependent on a varying heat dissipation due to convection. Thus, the temperature constancy is not only improved over the whole surface of the godet, but the temperature is also rendered more constant during the operation period of the heated godet.

Generally, the heating liquid used may be any liquid whose thermal conductivity is better than that of air. Liquids having a higher viscosity are, however, preferred. Especially suitable are, for example, mineral oils or silicone oils resistant to high temperatures.

The heating liquid which, in the heated godet of the invention, transfers the heat from the stationary heating body to the rotating cylinder, may be encased in the heated godet. Since, in most cases, a perfect sealing is, however, difficult to obtain, it is advantageous, in this case, to provide the godet with a device for refilling the heating liquid. It is likewise possible to continuously recycle the heating liquid in the gap between the stationary heating body and the rotating cylinder by means of an additional device.

In a preferred embodiment of the heated godet of the invention, the stationary heating body is passed and heated by a heating liquid, while part of the heating liquid simultaneously circulates through the gap between the heating body and the rotating cylinder.

The heated godet of the invention is illustrated diagrammatically by way of example in the accompanying drawing. Referring to the drawing, FIG. 1 is a cross section and FIG. 2 is a cross section.

FIG. 1 shows a diagrammatic view of the heated godet of the invention with the heating liquid encased. The stationary heating body 1 is heated in usual manner from outside by means of a heating medium such, for example, as steam or hot water which enters the heating body by the inlet opening 2 and escapes through the outlet opening 3. The cylinder 5 driven by the shaft 4 and the stationary heating body 1 form a gap 6 which is filled with the heating liquid. This heating liquid may be filled into the apparatus by means of a valve 7.

As shown in FIG. 1 the head 19 which closes heating body 1 and cylinder 5 is fixed in any suitable manner. Thus heating body 1 secured to head 19 is also fixed while cylinder 5 is rotated by shaft 4 and makes sealing contact with the bearing surface 21 of head 19.

Figure 2:
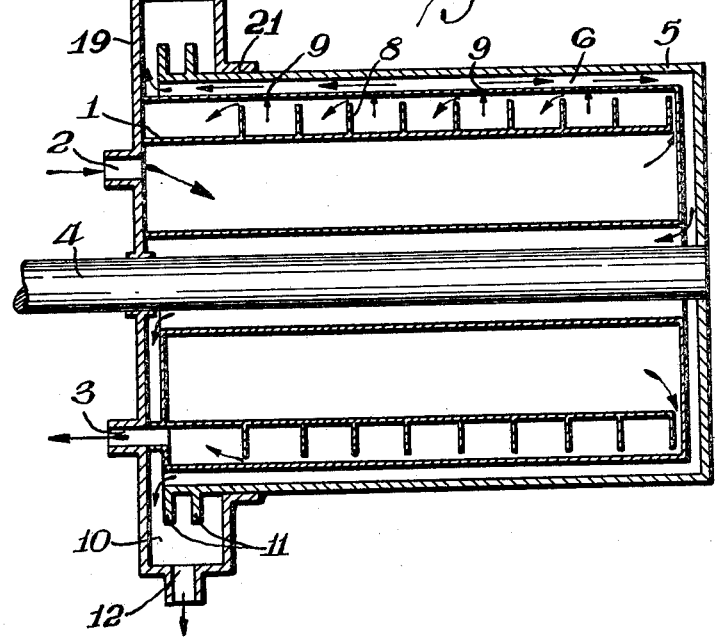

FIG. 2 shows the preferred embodiment of the heated godet of the invention, wherein part of the heating liquid circulating through the stationary heating body passes through the gap between the heating body and the rotating cylinder. The stationary heating body 1 is passed by the heating medium entering through the inlet opening 2. The majority of the liquid escapes through the outlet opening 3 and is recycled into the heating vessel (not shown). When passing the stationary heating body 1 the heating medium is recirculated by baffle edges 8. Part of the heating medium enters the gap 6 between the stationary heating body 1 and the rotating cylinder 5 driven by the shaft 4 through fine bore holes 9. This part of the heating liquid passing through the gap 6 arrives at a circular passage 10 in which it is thrown off be means of splash rings 11. It finally leaves the apparatus through a conduit 12 and is recycled into the heating vessel (not shown). The conduit 12 may be evacuated if too small a difference of level between the godet and the heating vessel is the reason for an insufficient discharge from the circular passage 10.

The preferred embodiment of the heated godet of the invention shown in FIG. 2 may also be heated with hot steam instead of a heating liquid, although this increases the difficulties in sealing the apparatus.

The heated godet shown in FIG. 2 was used for carrying out comparative tests. In a first test, the stationary heating body 1 was heated to 130° C. by means of silicone oil after the fine bore holes 9 had been closed so that nothing of the heating liquid could pass through the gap 6. The gap 6 was only filled with air. When the width of the gap 6 between the stationary heating body 1 and the rotating cylinder 5 was 0.5 millimeter and the circumferential speed of the rotating cylinder 5 was 500 metres per minute, the surface of the godet had a temperature of 100° C. only. The temperature difference between the stationary heating body 1 and the surface of the godet was therefore 30° C.

The second test was carried out under the same conditions but with the bore holes 9 open so that part of the heating liquid could pass through the gap 6. This test revealed a temperature difference between the stationary heating body 1 and the surface of the godet of 8° C. only.

The tests show that the heated godet of the invention assures a far better heat transfer between the stationary heating body and the rotating cylinder than the usual apparatuses. The temperature of the surface of the godet adapts itself to the temperautre of the heating body rapidly and without fluctuation so that the heat quantities dissipated by convection or transferred by heat contact to the filaments to be heated for being drawn, can be supplied rapidly.

When a heating liquid is used, the heated godet of the invention is suitable for a group regulation, i.e. for heating about ten godets heated in the manner disclosed, a single heating and regulating arrangement is sufficient, from which the liquid stream is simultaneously conducted to the individual godets. Thus, the expenditure for heating and regulating is considerably reduced in comparison to other devices.

What is claimed is:

1. In a heated godet comprising a rotating cylinder, a stationary heating body axially positioned within said cylinder, a gap formed between the internal surface of said cylinder and the external surface of said heating body, said rotating cylinder being filled with a heating liquid having a thermal conductivity better than that of air, and means for supplying said heating liquid for passing through said heating body and simultaneously circulating through said gap between said heating body and said rotating cylinder.

2. The heated godet of claim 1 wherein fine bore holes are in said heating body communicating with said gap, and an outlet conduit communicating with said gap.

3. The heated godet of claim 2 wherein baffle edges are in said heating body disposed upstream from said bore holes to facilitate the flow of some of said heating liquid through said bore holes.

4. The heated godet of claim 3 wherein splash rings are in said gap disposed upstream from said outlet conduit to facilitate the flow of heating liquid into said conduit.

5. The heated godet of claim 4 including an inlet opening and an outlet opening communicate with said heating body whereby heating liquid may be fed into said heating body with part of said liquid ultimately being discharged through said outlet opening and the remainder of said heating liquid being recirculated by said baffle edges into said gap through said bore holes and then being thrown off by said splash rings through said outlet conduit for recycling.

References Cited

UNITED STATES PATENTS

| | | | |
|---|---|---|---|
| 2,173,002 | 9/1939 | Jordan et al. | 28—71.3 |
| 2,563,692 | 8/1951 | Ostertag et al. | 165—89 |
| 2,783,977 | 3/1957 | Seanor | 165—89 |
| 2,993,260 | 7/1961 | Boerma et al. | |
| 3,006,610 | 10/1961 | Siegll | 165—89 |

WILLIAM J. STEPHENSON, Primary Examiner

U.S. Cl. X.R.

28—71.3; 165—89, 142